United States Patent

Suzuki et al.

[11] Patent Number: 5,487,808
[45] Date of Patent: Jan. 30, 1996

[54] APPARATUS FOR LAMINATING PLATES

[75] Inventors: Isao Suzuki; Masuo Shindo; Kiyoshi Nakao, all of Kawasaki, Japan

[73] Assignee: Fuji Electric Co., Ltd., Kanagawa, Japan

[21] Appl. No.: 195,134

[22] Filed: Feb. 9, 1994

Related U.S. Application Data

[63] Continuation of Ser. No. 152,007, Nov. 15, 1993, abandoned.

[30] Foreign Application Priority Data

Nov. 16, 1992 [JP] Japan .................................. 4-304208
Feb. 16, 1993 [JP] Japan .................................. 5-025868

[51] Int. Cl.⁶ ......................................... B32B 31/00
[52] U.S. Cl. ........................... 156/556; 156/538; 414/793; 414/793.3
[58] Field of Search ........................... 156/538, 556; 198/350, 468.5, 690.1; 414/788.9, 789, 790.8, 793, 793.1, 793.2, 793.3, 793.4

[56] References Cited

U.S. PATENT DOCUMENTS

| | | |
|---|---|---|
| 3,172,526 | 3/1965 | Buccicone . |
| 3,727,758 | 4/1973 | Cleland .............................. 198/690.1 X |

FOREIGN PATENT DOCUMENTS

| | | |
|---|---|---|
| 1209502 | 1/1966 | Germany . |
| 1756126 | 8/1970 | Germany . |
| 105176 | 4/1974 | Germany . |
| 2427731 | 1/1976 | Germany . |
| 2506681A1 | 8/1976 | Germany . |
| 332803 | 10/1976 | Germany . |
| 3216834A1 | 11/1983 | Germany . |
| 3216822C2 | 11/1983 | Germany . |
| 2506681 | 8/1986 | Germany . |
| 62-191366 | 8/1987 | Japan . |
| 667347A5 | 9/1988 | Switzerland . |

*Primary Examiner*—James Engel
*Attorney, Agent, or Firm*—Finnegan, Henderson, Farabow, Garrett & Dunner

[57] ABSTRACT

An apparatus for laminating plates having guide holes for aligning each plate to a predetermined position. A horizontal base is provided for stacking the plates thereon. A conveyor device conveys the plates to a predetermined position over the horizontal base one by one, the conveyor device dropping the plates on the horizontal base from the predetermined position so as to laminate the plates to each other. A guide device including guide pins which are disposed perpendicular to the conveyed plate at the predetermined position above the conveying device, the guide pins moving together with the falling plate to engage in the guide holes, respectively, to align each of the plates along the guide pins while laminating the plate on the horizontal base, and to return the guide pins to the initial position thereof.

9 Claims, 5 Drawing Sheets

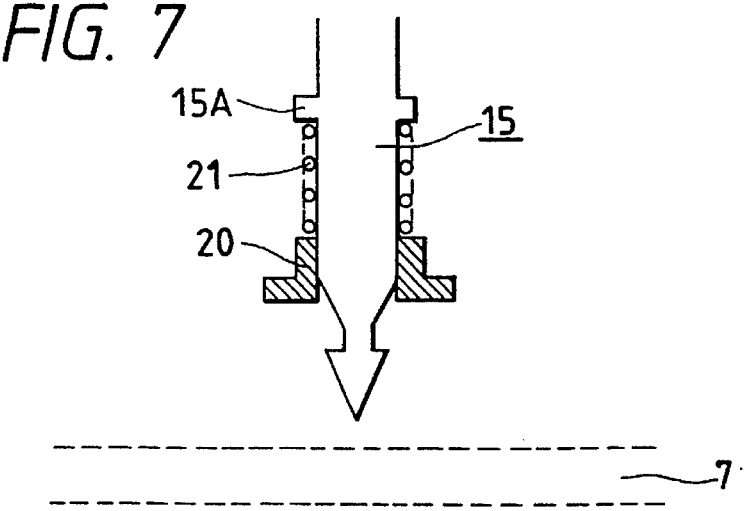
FIG. 7
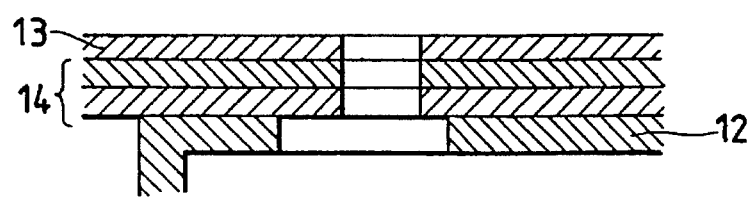
FIG. 8
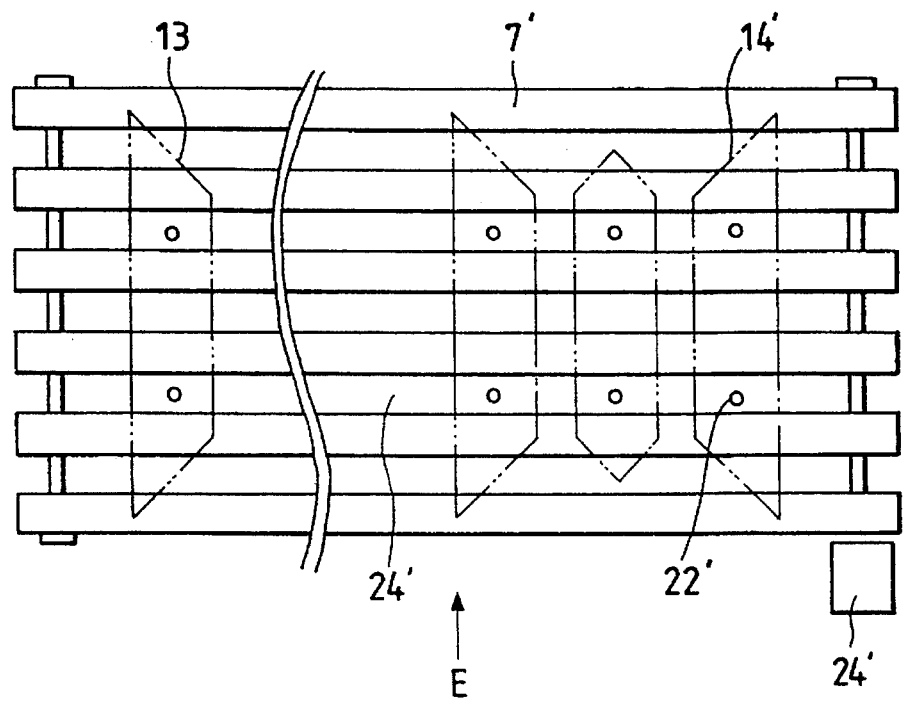

APPARATUS FOR LAMINATING PLATES

This application is a continuation of U.S. patent application Ser. No. 08/152,007, filed Nov. 15, 1993, now abandoned under 35 U.S.C. §120.

BACKGROUND OF THE INVENTION

The present invention relates to an apparatus for laminating plates. More particularly, the invention relates to an apparatus for laminating magnetic plates at aligned positions in the production of iron cores for transformers or the like.

In the conventional plate stacking apparatus for constructing the iron core of a transformer, for example, legs or yokes in the core are formed by lamination of pre-shaped magnetic plates. The magnetic plates must be aligned when laminated to provide a predetermined shape in the formed core, and special laminating apparatus or jigs are necessary. FIG. 10 shows a sectional view representing the basic arrangement of a conventional apparatus for such laminating of plates. In FIG. 10, a horizontal base 1 is provided with two upstanding cylindrical guide pins 2. Correspondingly, the laminated plates 3 are provided with guide holes 4 at predetermined positions. The predetermined positions are such that a section of a laminated body is formed to a predetermined shape when the guide pins 2 are inserted into the two guide holes 4 of each plate to laminate the plates. As the plates are laminated on the horizontal base 1, two workers 5 hold respective edges of one plate 3 to position the guide holes 4 upon the guide pins 2 so that the guide pins 2 are received in the respective guide holes 4 and so that each plate 3 falls on the base 1 while it is guided by guide pins 2. In accordance with such a procedure, the plates 3 are laminated on the horizontal base 1 in an order to develop the predetermined shape of the core or core part. The assembly 30 formed by a predetermined number of the plates is lifted from the guide pins 2 as a structure of a core leg or yoke while being oriented in a horizontal attitude. Moreover, such lamination of the plates 3 may be performed by a machine or with the use of tools instead of the manual operation described. A basic feature of the above-described conventional lamination is that the plates are presented perpendicular to the guide pins in order.

However, the conventional lamination of the plates has the following problems. As shown in FIG. 11, when a plate is being guided by pins 2, the plate 3 may become inclined with respect to the pins so as to bind and stop along the lengths of the pins. In large size transformers, the length of an iron core leg or part may be as long as 5 meters, for example. Ordinarily, with a plate of such length, the falling speed throughout the length of the plate may not be constant. Moreover, it is difficult to maintain the horizontal orientation of the plate as it is lowered on the pins and, quite frequently, the plate may hang up and stop on the pins. When this occurs, the plate 3 should be pulled up from the pins and repositioned thereon, or the plate 3 should be adjusted so as to fall smoothly along the pins. As a result, the laminating procedure requires excessive time and labor.

Further, when a plurality of plates are laminated and the guide pins are pulled out from the laminated assembly, a large frictional resistance is generated between the guide holes and the guide pins, so that the guide pins are difficult to pull out. Accordingly, the plates may not be laminated to form a thick layered assembly at one time. As a result, a small number of the plates are laminated and pulled from the pins as relatively thin, subassemblies which are further laminated to each other to provide the predetermined thickness and shape of the layered body. This process is troublesome.

SUMMARY OF THE INVENTION

The present invention has been made in view of the above circumstances and has as an object to provide an apparatus for laminating plates to produce a leg or yoke of an iron core for a transformer, in which the work of laminating progresses smoothly.

To achieve the objects and in accordance with the purposes of the invention, as embodied and broadly described herein, there is provided the apparatus for laminating plates having guide holes at predetermined positions, the apparatus comprising a horizontal base for laminating the plates thereon, a belt conveyer for conveying the plate to a position above the horizontal base, and guide elements for aligning each position of the plates during lamination. The conveyer is provided with at least two endless conveyer belts disposed in spaced parallel relation and magnetic elements located on the reverse side of the belt for attracting the plate to the belts. The guide elements are disposed above the belt-conveyer in the space between the parallel endless belts and provided with guide pins which are driven when a plate is conveyed by the belt-conveyer reaches the predetermined position, so as to be inserted in the guide holes of the plate. The magnetic elements are demagnetized when the ends of guide pins are inserted in the guide holes, and the guide pins are driven to the predetermined laminating position for the plate together with the plate at the time that the magnetic elements are demagnetized and is returned to the initial position thereof after lamination of the plate to the predetermined position. Further, more than two endless belts may be provided and the guide pins may be disposed in at least two spaces between the endless belts. The guide pins may be located on a line perpendicular to the conveying direction of the plate conveyance.

Further, each guide pin is provided with a tapered shape, gradually enlarging in diameter, from the constricted part to a cylindrical part. Moreover, the guide elements include a holding part about the guide pin and movable with the guide pin through a pressing spring. The horizontal base has a lifter for elevating and lowering the horizontal base.

In accordance with the preferred embodiments of the invention, the plate is not moved toward fixed guide pins for insertion of the pins into holes of the plates, but the pin is moved and inserted in the hole of the plate so as to laminate the plate at the predetermined position. Therefore, the plate does not stop along the length of the guide pin. Further when the plate falls, since a guide hole of the plate is engaged with the constricted part of a guide pin, the plate almost exactly reaches the predetermined position. If the fallen position shifts from the predetermined position, the guide pin is inserted further into the hole so as to cause the tapered shape and the following cylindrical portion to adjust the position of the plate to the predetermined position and to exactly laminate the plates. Furthermore, when the guide pin returns to the initial position after the plates are laminated at the respective correct positions, since the holding part positioned around of the guide pin holds the plate to the predetermined position, the plate does not rise up together with the guide pin. Finally, since the lifter disposed under the horizontal base adjusts the height of the base, a space between the conveying belt and the layers of the plates is adjusted, so that the inserted depth of the guide pin to the guide hole is kept constant.

BRIEF DESCRIPTION OF THE DRAWINGS

The accompanying drawings, which are incorporated in and constitute a part of this specification illustrate embodiments of the invention and, together with the description, serve to explain the objects, advantages, and principles of the invention.

In the drawings:

FIG. 7 is a sectional view representing a condition of the guide pin returning to the initial position shown in FIG. 3;

FIG. 8 is a plan view of an apparatus for laminating the plates in accordance with another embodiment of the invention;

DETAILED DESCRIPTION OF THE PREFERRED EMBODIMENTS

Figure 1:
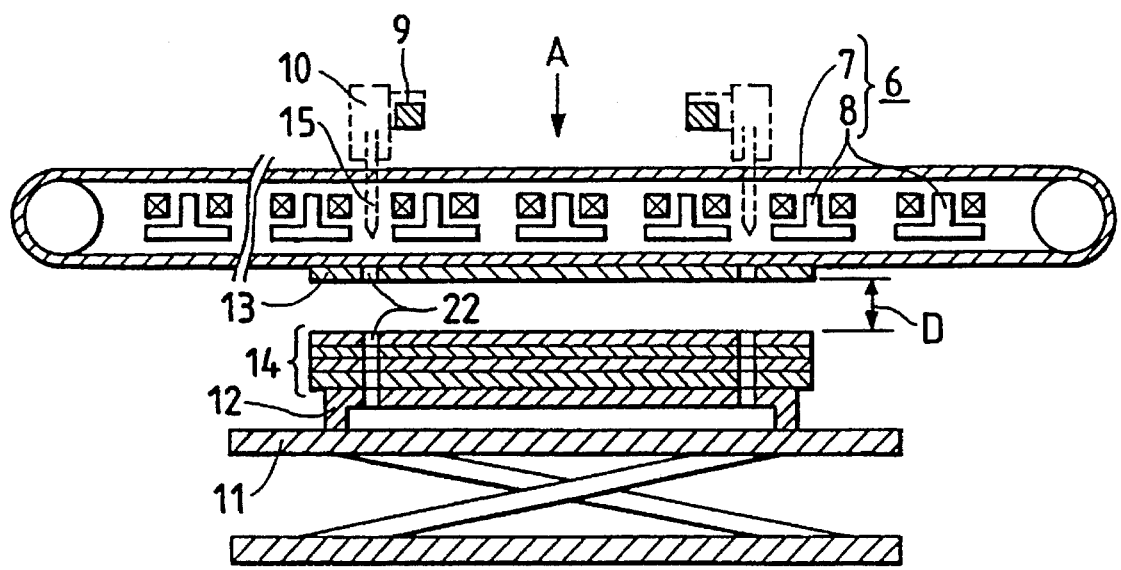
FIG. 1 is a sectional view of an apparatus for laminating the plates in accordance with an embodiment of the invention.

Reference will now be made in detail to the present preferred embodiments of the invention, examples of which are illustrated in the accompanying drawings. In FIG. 1, a horizontal belt conveyer 6 is shown and includes conveying belts 7. The conveying belts 7 are endless and provided with magnet elements 8. The magnet elements 8 in FIG. 1 are represented as electric magnets, but permanent magnets can be used. An advantage of electric magnets is that they are controllable. However, they are also high in cost. Permanent magnets, which are low in cost, are preferably used. To control permanent magnets, a control device (not shown) for translating the permanent magnets toward and away from the lower runs of the belts 7 should be provided. Under the belt conveyer 6, a horizontal base 12 and a lifter 11, for raising and lowering the horizontal base 12, are disposed. Plates 13 are supplied from a position (not shown) to the left of the lifter 11, as shown in FIG. 1, and one of the plates is shown attracted to the undersurface of the bottom run of the endless belt conveyer 7 by the magnet elements 8. In this condition, the plate 13 is conveyed to a position above the horizontal base 12 as shown. Then plate 13 is laminated on the horizontal base 12. The laminated plates are shown as a layered assembly 14. The laminating apparatus in the illustrated embodiment is used when the plates are subject to conveyance while oriented in a longitudinal direction.

Figure 2:
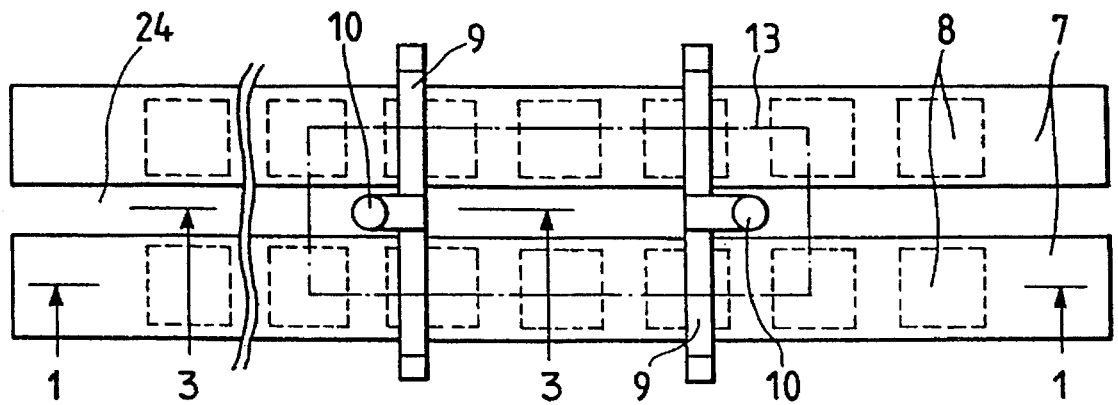
FIG. 2 is a view from a direction A in FIG. 1.
Figure 3:
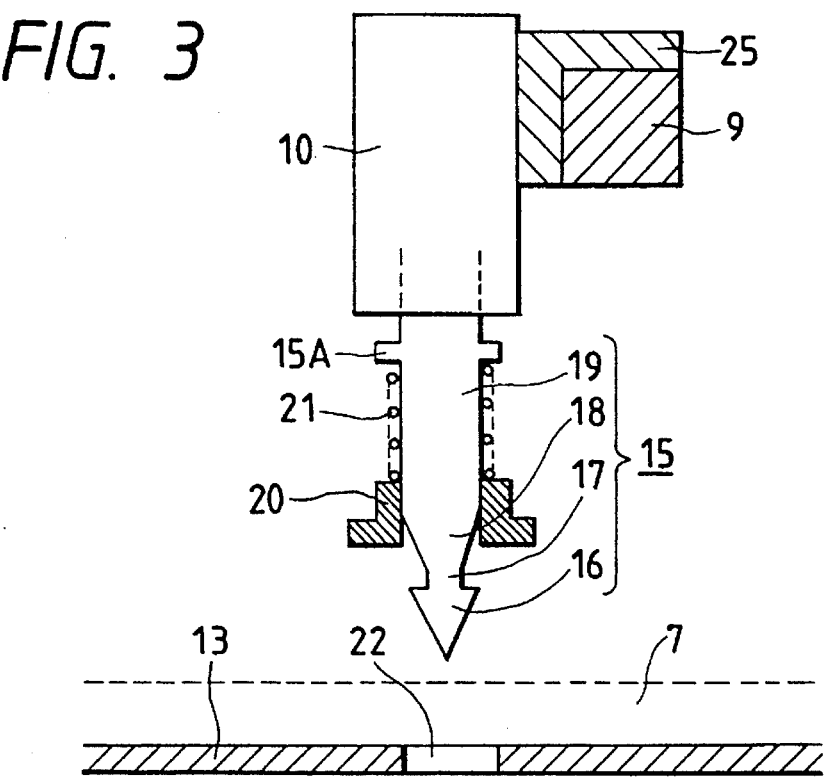
FIG. 3 is a sectional view of the guide pin on the line C—C of FIG. 2.

FIG. 2 is a plan view of the apparatus shown in FIG. 1. Also, FIG. 1 corresponds to a section on line B—B in FIG. 2. FIG. 3 shows a section on line C—C in FIG. 2. The conveyer 7 is provided with two belts having a space 24 therebetween. Two cylinders 10 are fixed in the space by respective supports 9. A plate 13 shown by dot/dash line is attracted to the surfaces of the two conveying belts. In FIG. 2, a construction of a guide pin raising and lowering cylinder 10 is shown. The cylinder 10 is fixed on the support 9 through an attachment 25 and supports a guide pin 15 extending from the bottom thereof. The guide pin 15 includes a tip portion 16, constricted portion 17, tapered portion 18 and cylindrical portion 19. All of the guide pin portions are coaxial and circular in cross-section. The maximum diameter of the tip portion 16 is slightly smaller than the diameter of the cylindrical portion 19. The guide pin 15 is provided with a holding member 20 having an annular flange and movable in the longitudinal direction. The guide pin has a projecting portion 15A supporting a pressure spring 21 with the holding member 20. Therefore, the holding member 20 is fixed to the spring 21 and moved with the guide pin through the spring 21. FIG. 3 shows the plate 13 conveyed by the conveyor 7 to a position under the guide pin 15.

Returning to FIG. 1, when the plate 13 is conveyed horizontally to overlie the horizontal base 12, it reaches a position where the guide pin becomes aligned with a guide hole 22. The tip of the guide pin 15 is positioned above the attracting surface of the plate conveying belts. Further, the lifter 11 keeps constant a space D between the plate 13 and the assembled layers 14. The lifter 11 is controlled by an automatic control device (not shown) for detecting the height of the space D. Therefore, the vertical stroke of the guide pin is constant so as to simplify the system of the cylinder 10.

Figure 4:
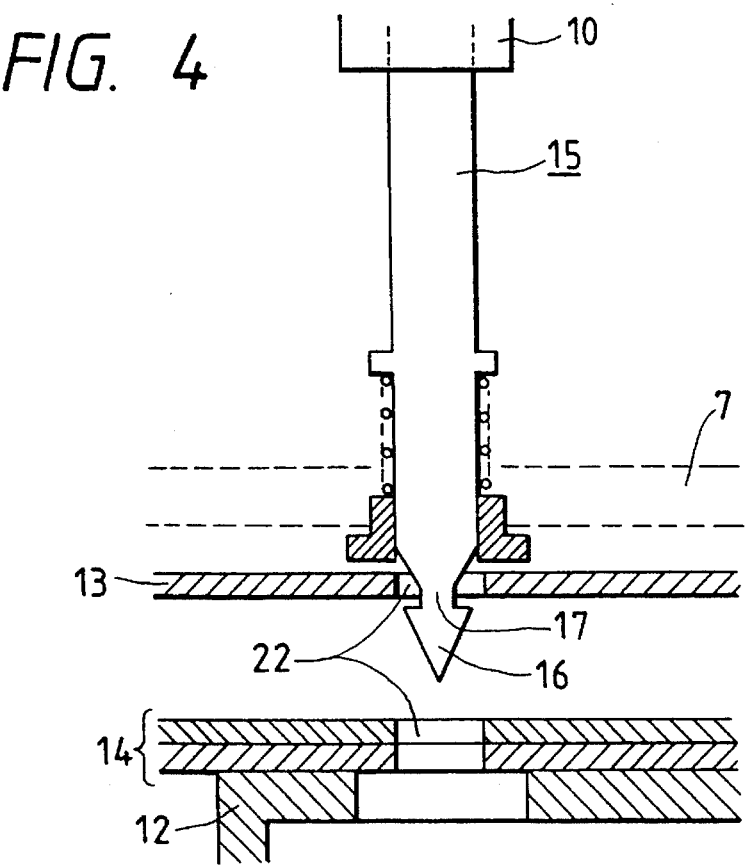
FIG. 4 is a sectional view representing a condition of the guide pin while the plate falls.

FIGS. 4 to 7 are sectional views showing conditions during movement of the guide pin 15 shown in FIG. 3. FIG. 4 shows a condition in which the plate is lowered approximately one-half the vertical distance of travel from the belts 7. When the plate 13 is conveyed to overlie the horizontal base 12, the guide pin is positioned over the guide hole 33, which is provided on the predetermined position of the plate 13, the conveying belt is stopped and the guide pin 15 is driven. When the tip portion 16 of the guide pin 15 reaches the guide hole 22 of the plate 13, the magnet elements are demagnetized. As the result, the attracting force of the magnet elements disappears or becomes weak, and the plate 13 falls by its own weight. Simultaneously, the guide pin 15 is further driven in a downward direction. Thus, the plate 13 reaches the horizontal base 12 together with the guide pin 15. If the plate 13 falls unevenly, or deforms to concave shape or convex shape or the like, the plate 13 hangs on the constricted portion 17 of the guide pin 15 so that the plate 13 reaches the horizontal base 12 with the guide pin 15.

Figure 5:
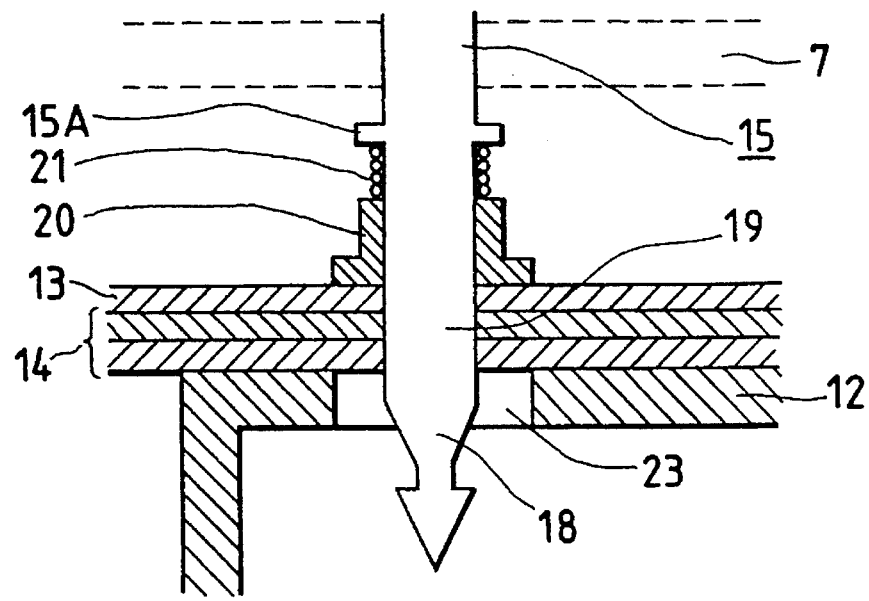
FIG. 5 is a sectional view representing a condition of the guide pin while the plate is laminated along the guide pin.

FIG. 5 shows the condition of laminating a plate 13 by the guide pin 15. In this condition, when the guide pin 15 further descends, if the plate 13 has shifted from the proper predetermined position, the tapered portion 18 and the cylindrical portion 19 cause the shifted plate to adjust to the position of the assembled layers 14. After the holding portion 20 contacts the plate 13, the guide pin 15 stops after compressing the spring 21 by a predetermined length. On the other hand, when the number of the plates included in the assembled layers 14 is few in number, the horizontal base 12 has a passing hole 23 for preventing collision between the guide pin 15 and the horizontal base 12.

Figure 6:
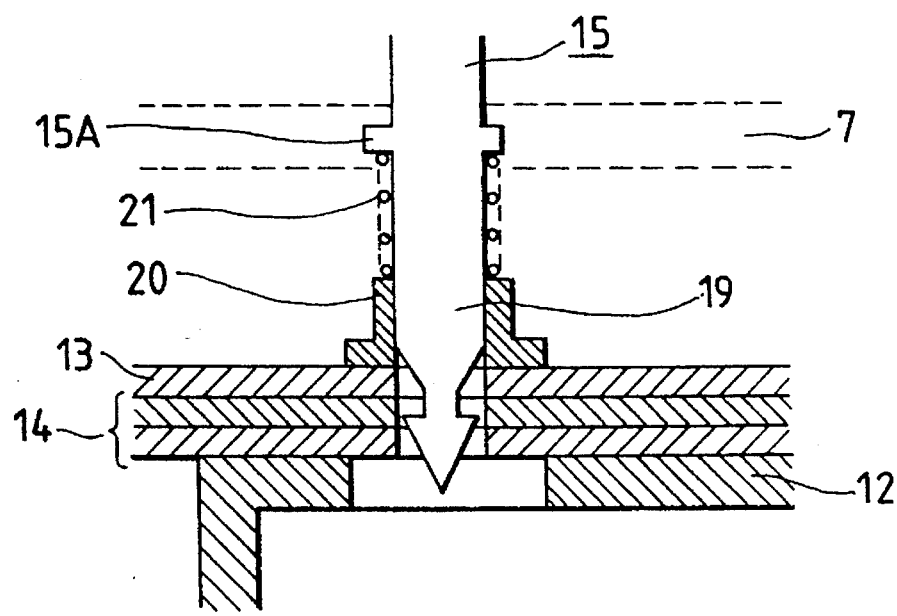
FIG. 6 is a sectional view representing a condition of the guide pin while the guide pin rises.

FIG. 6 shows the condition of the guide pin 15 rising. If the guide pin rises, the spring 21 extends so as not to move the holding portion 20 which continuously presses the plate 13. When the spring 21 extends to full length, the holding portion 20 rises after the guide pin has risen by a portion of its stroke. Accordingly, if the guide pin 15 hangs on the edge of the guide hole 22 of the plate 13, the plate 13 may be not pulled up.

FIG. 7 shows the condition in which the guide pin 15 has risen to above the level of the attracting surface of conveying belt and returns to the initial position shown in FIG. 3. The plate 13 is held on the layers 14 to keep the lamination assembly.

FIG. 8 is a plan view of the laminating apparatus of another embodiment of the invention. The apparatus shown in FIG. 8 is used where the plate is laminated when oriented perpendicular to the conveying direction of the plate. This embodiment differs from FIG. 1 in that the conveyer is constructed by six endless belts 7' which are provided in parallel and have spaces 24' therebetween. The longitudinal direction of the plates 13 is arranged perpendicular to the conveying direction, and two guide holes 22' are disposed in at least two of the spaces 24'. The plates 13 are conveyed from left to right as shown in FIG. 8.

The apparatus shown in FIG. 8 is for laminating the plates 13 for a main leg of each phase of three phases iron core. The plates 13 are conveyed to each position for the main legs by a drive control of servomotor 24'. After that, each plate 13 is dropped downward, and layered assembly 14' is formed.

Figure 9:
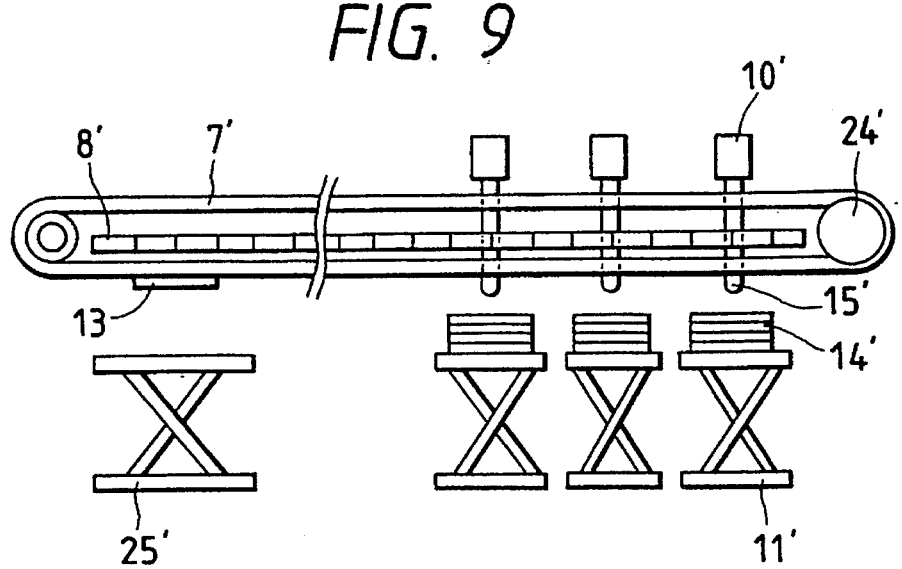
FIG. 9 is a view from a direction E shown in FIG. 8.
Figure 10:
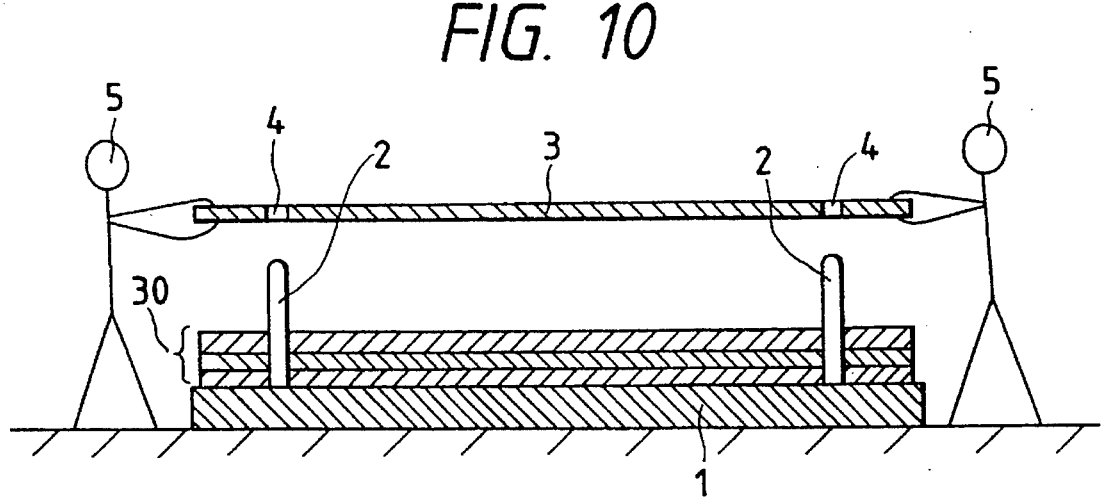
FIG. 10 is a section view of an apparatus for laminating the plates of the conventional apparatus.
Figure 11:
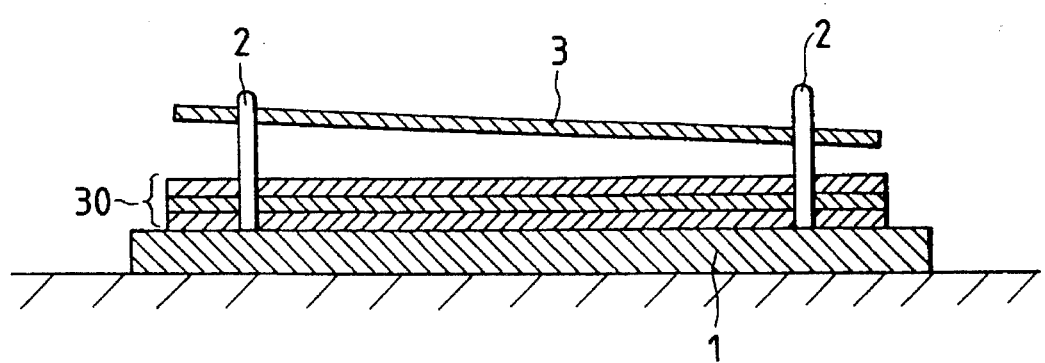
FIG. 11 is a sectional view representing a condition that the plate stops on the guide pin in the construction shown in FIG. 10.

FIG. 9 shows a side view of the laminating apparatus shown in FIG. 8, as seen in the direction of an arrow R. Similar to FIG. 1, magnet elements 8' are provided inside of the conveying belt 7', and the plate 13 is attracted on the undersurface of a bottom run of the belts 7'. On the left side of the apparatus as shown in FIG. 9, a lifter 25' elevating the plates 13 to the undersurface of the conveying belt 7' is provided, and on the right side of the apparatus, the layers 14' are stacked on lifters 11' for each phase. The upper part of the layers 14', guide pins 15' are supported by cylinder portions 10', respectively, through some supports (not shown), similar to FIG. 3.

In FIG. 9, the plates 13 on the lifter 25' are attracted on the undersurface of the conveying belt 7' by the magnet elements 8' one by one so as to convey the plates 13. The plates 13 are dropped onto the layers 14' by the guide pins 15' so as to laminate on the lifters 11' of respective phases.

As was described above, in the conventional apparatus, the plates were aligned with straight guide pins from the upward direction so as to laminate each plate to an under layer. In the case when a plate hangs on the guide pins, the plate is adjusted manually or by another machine. By comparison, the apparatus of the preferred embodiments of the present invention inserts a desirable guide pin into the plate only when laminated, and the guide pins are pulled out of the plates one by one. Accordingly, need for pulling the guide pins from thin laminated assemblies of the plates is avoided. Further in the case where the position of the laminated plate shifts a little from a predetermined position, the guide pins according to the invention adjust the position of the plate so as to improve performance of laminating apparatus. Particularly, the feature adjusting the position is very useful to automate the laminating apparatus.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for laminating plates in an aligned position, each plate defining at least two guide holes, comprising:

a horizontal base for receiving a stack of said plates;

conveying means for conveying said plates to an elevated predetermined position overlying said horizontal base, one by one, said conveying means dropping said plates from said predetermined position onto said horizontal base to laminate said plates to each other; and guide means including at least two guides pins overlying said conveying means in an elevated initial position and oriented to be perpendicular to a conveyed plate at said predetermined position, said guide means moving said guide pins downwardly from said initial position with a dropping plate to remain in said guide holes, respectively, to align each of said plates separately by said guide pins while laminating each plate on said horizontal base, and to return said guide pins to the initial position thereof.

2. An apparatus according to claim 1, wherein said conveying means includes at least two parallel endless conveying belts having a space therebetween and magnet elements inside said endless belts, said magnet elements attracting said plates to the under surface of said endless belts to convey said plates to overlie said horizontal base.

3. An apparatus according to claim 2, wherein said magnet elements are electric magnets which are demagnetized when the conveyed plate is conveyed to said predetermined position, so that the conveyed plate is dropped on said horizontal base.

4. An apparatus according to claim 2, wherein said guide means are disposed in said space between said endless belts, and said plates are conveyed so as to align said guide holes to said space, said guide pins being inserted in said guide holes through said space.

5. An apparatus according to claim 4, wherein each of said guide pins comprises a cylindrical portion, a tapered portion continuing from the cylindrical portion, a constricted portion continuing the tapered portion, and a tip portion of the bottom end thereof, said guide holes being hangable on said constricted portion.

6. An apparatus according to claim 1, wherein said guide means includes holding means connected to said guide pin through spring means, said holding means having a ring shape around said pin and being slidable on said pin in the longitudinal direction thereof, said holding means holding said laminated plate to said horizontal base when said guide pins are retracted from said laminated plate to the initial position.

7. An apparatus according to claim 1, wherein said horizontal base defines passing holes aligned with the respective pins.

8. An apparatus according to claim 1, wherein said horizontal base is on a lifter for controlling the height of said horizontal base to keep constant a distance between said pins and the top surface of said laminated plate.

9. An apparatus according to claim 1, wherein said conveying means includes more than two parallel endless belts and said guide pins are located in the respective spaces between said parallel endless belts.

* * * * *

UNITED STATES PATENT AND TRADEMARK OFFICE
CERTIFICATE OF CORRECTION

PATENT NO. : 5,487,808
DATED : January 30, 1996
INVENTOR(S) : Isao SUZUKI et al

It is certified that error appears in the above-indentified patent and that said Letters Patent is hereby corrected as shown below:

Claim 1, Column 6, Line 15, "guides pins" should read --guide pins--.

Signed and Sealed this

Eighth Day of October, 1996

Attest:

BRUCE LEHMAN

Attesting Officer

Commissioner of Patents and Trademarks